US 6,622,102 B2

(12) United States Patent
Skidmore

(10) Patent No.: US 6,622,102 B2
(45) Date of Patent: *Sep. 16, 2003

(54) METHOD AND SYSTEM FOR TRACKING MANUFACTURING DATA FOR INTEGRATED CIRCUIT PARTS

(75) Inventor: Beth Skidmore, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/160,380

(22) Filed: May 30, 2002

(65) Prior Publication Data

US 2002/0152043 A1 Oct. 17, 2002

Related U.S. Application Data

(63) Continuation of application No. 08/915,885, filed on Aug. 21, 1997, now Pat. No. 6,446,017.

(51) Int. Cl.⁷ .............................................. G06F 19/00
(52) U.S. Cl. ........................... 702/84; 702/81; 702/118
(58) Field of Search ..................... 702/81–84, 33–36, 702/40, 108, 113–115, 117–123, 179, 180, 182–185, 187, FOR 155, FOR 135–FOR 137, FOR 139, FOR 170, FOR 123–FOR 125, FOR 171; 438/10–12, 14–18; 324/764–769, 550, 537; 257/529, 65; 235/385, 462.01; 250/566, 568; 700/109, 110, 115, 116, 119–121; 209/571–573, 583; 365/201, 225.7

(56) References Cited

U.S. PATENT DOCUMENTS

| 4,825,093 A | 4/1989 | Kiriseko et al. ............ 250/566 |
| 5,240,866 A | 8/1993 | Friedman et al. .............. 437/8 |
| 5,294,812 A | 3/1994 | Hashimoto et al. ........... 257/65 |
| 5,360,747 A | 11/1994 | Larson et al. .................. 437/8 |
| 5,555,504 A | 9/1996 | Lepper et al. ......... 364/465.22 |
| 5,567,927 A | 10/1996 | Kahn et al. ................. 235/462 |
| 5,642,307 A | 6/1997 | Jernigan ..................... 365/103 |
| 5,726,920 A | 3/1998 | Chen et al. ................. 364/579 |
| 5,805,472 A * | 9/1998 | Fukasawa ................... 702/118 |
| 5,856,923 A | 1/1999 | Jones et al. ............ 364/468.28 |
| 5,915,231 A * | 6/1999 | Beffa .......................... 702/118 |
| 5,927,512 A | 7/1999 | Beffa .......................... 209/573 |
| 5,963,881 A | 10/1999 | Kahn et al. .................... 702/35 |
| 6,427,092 B1 * | 7/2002 | Jones et al. ................. 700/121 |
| 6,446,017 B1 * | 9/2002 | Skidmore .................... 702/81 |

* cited by examiner

Primary Examiner—Hal Wachsman
(74) Attorney, Agent, or Firm—Schwegman, Lundberg, Woessner & Kluth, P.A.

(57) ABSTRACT

An apparatus and method for tracking data for individual integrated circuits through the manufacturing process is described by programming an individual part identifier into a non-volatile portion of the integrated circuit and maintaining a database of all manufacturing step statistics for later review and analysis. The part identifier allows individual integrated circuits to be moved through the manufacturing process without the need to physically track original fabrication lots. The database of information is used to improve the manufacturing process by identifying failure trends based upon process variations.

36 Claims, 3 Drawing Sheets

METHOD AND SYSTEM FOR TRACKING MANUFACTURING DATA FOR INTEGRATED CIRCUIT PARTS

CROSS-REFERENCE TO RELATED APPLICATION(S)

This patent application is a continuation of U.S. application Ser. No. 08/915,885, filed on Aug. 21, 1997, now issued as U.S. Pat. No. 6,446,017 on Sep. 3, 2002, the specification of which is incorporated herein by reference.

FIELD OF THE INVENTION

This invention relates to integrated circuits, and more particularly to a system and method for tracking integrated circuit parts through the manufacturing process.

BACKGROUND OF THE INVENTION

In the manufacturing of integrated circuit parts ("IC parts"), a wafer consists of several hundred die. A set of wafers is grouped together and called "lots". At each step of manufacturing, a lot is processed and the resulting data about the lot can be stored in a database. Ideally, lots proceed through the manufacturing process together so that the database of information can be useful in analyzing problems or defects in specific lots.

Unfortunately, in the real world, wafers can get separated from their lots and placed in new lots. During some steps, lots can be subdivided or combined into larger lots. Since lots do not remain static, it is a very tedious procedure to reconstruct all information gathered about a particular lot of wafers. In addition, with the movement of wafers among lots, the integrity of the lot data is jeopardized since the data for a lot may be inaccurate or incomplete.

Providing a method or system for tracking IC parts individually, regardless of their movement among various lots would produce a more accurate, detailed, and useful database.

Such a system would enable the entire manufacturing process to become much more productive with respect to the use of equipment and personnel by IC parts being allowed to flow through processes without trying to keep the original lots grouped in a meaningful order. Trying to keep lots grouped for the purpose of data analysis can waste much time. The lots go through different steps and get split up based on performance, causing the lots to continually decrease in size. Because it is a much more beneficial use of assets to work with large quantities of parts than many small groups, it is advantageous to move IC parts with no regard to their original lots. A system which would allow free movement of IC parts while retaining the ability for data analysis would make the manufacturing of IC parts more efficient.

SUMMARY OF THE INVENTION

The present invention solves the above-mentioned problems in the art and other problems which will be understood by those skilled in the art upon reading and understanding the present specification. The present invention provides an apparatus and method for tracking data for individual integrated circuits through the manufacturing process by programming an individual part identifier into a nonvolatile portion of the integrated circuit and maintaining a database of all manufacturing step statistics for later review and analysis. Typical uses for this data is in the review of the process steps used in producing particular lots of wafers of memory chips and tracking failure rates according to lot and wafers numbers.

BRIEF DESCRIPTION OF THE DRAWINGS

In the drawings, where like numerals refer to like components throughout the several views.

DETAILED DESCRIPTION OF THE PREFERRED EMBODIMENTS

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the invention is defined by the appended claims. In the figures, elements having the same number perform essentially the same functions.

Figure 1:
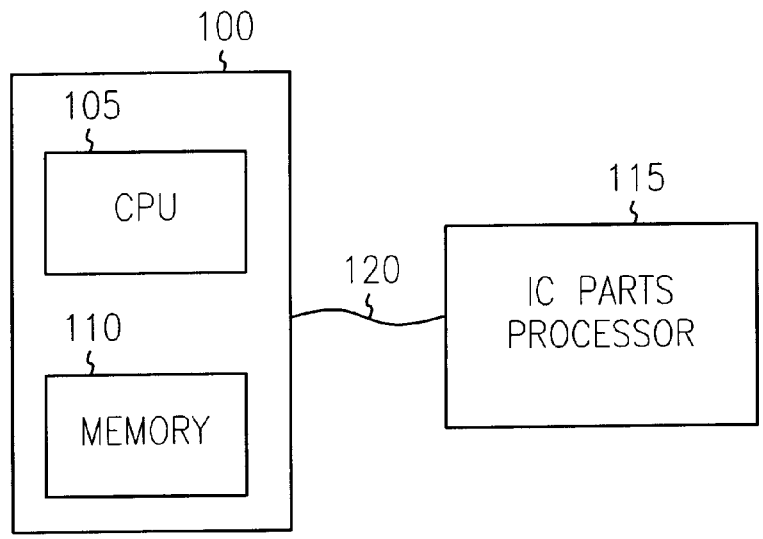
FIG. 1 is a block diagram of a computer system connected to a IC parts processor.

A computer system 100 as shown in FIG. 1 has a central processing unit ("CPU") 105 and a memory 110. Computer system 100 is coupled to a integrated circuit parts processor 115 by data bus 120. Computer system 100 can be a Sun workstation, available from Sun Microsystems of Palo Alto, Calif., or another general purpose computer. Memory 110 can be RAM, a disk or floptical drive, or another form of primary or secondary computer storage. Data bus 120 can be a serial or parallel cable, any time of computer network, or other data transfer mode. IC parts processor 115 can be any fabrication, probe or test machine used in the manufacturing or testing of semiconductors.

Figure 2:
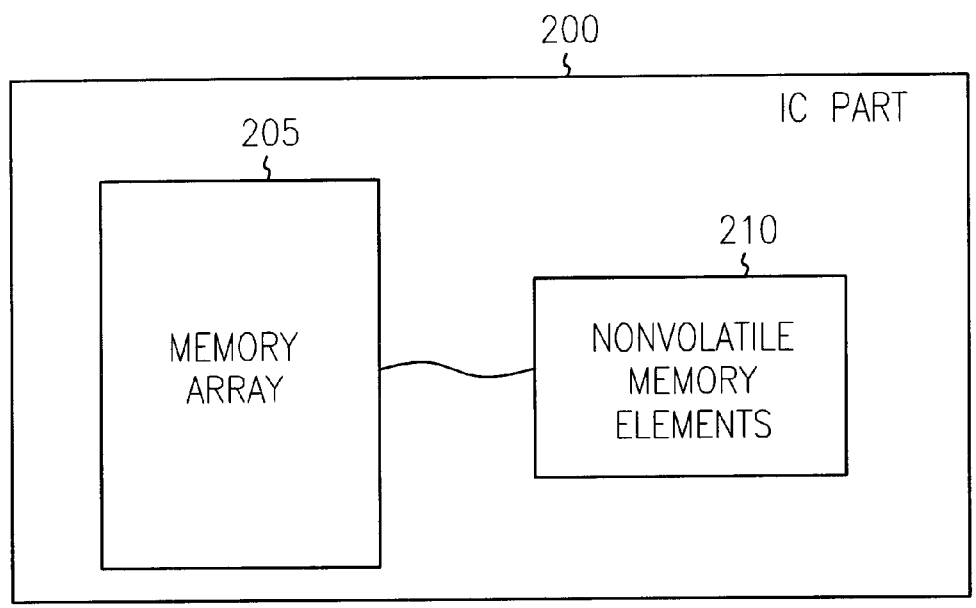
FIG. 2 is a block diagram of an IC part.

FIG. 2 is an integrated circuit part 200. IC part 200 can be a memory device such as a DRAM. A plurality of IC parts 200 can be combined and used to form memory modules. Such a memory module can be a Dual In-Line Memory Module ("DIMM"), a Single In-Line Memory Module ("SIMM"), or a Multi-Chip Module ("MCM"), or other such uses. In the alternative, IC part 200 can be used in a computer system for SRAM caching, various types of FLASH memory, SSRAM, PROM, EEPROM, etc.

Whatever the type of IC part 200, it contains a memory array 205 as well as a plurality of nonvolatile memory elements 210. These nonvolatile memory elements 210 may be antifuses, laser fuses, electrical fuses, FLASH memory cells, FERAM memory cells, or any other type of nonvolatile memory cell. Such nonvolatile memory elements 210 are well known in the semiconductor processing industry.

The nonvolatile memory elements 210 of IC part 200 can be used to store data relating specifically to the individual IC part 200. For example, such use of the nonvolatile memory elements 210 is described in "A STRUCTURE AND A METHOD FOR STORING INFORMATION IN A SEMICONDUCTOR DEVICE," by Zheng et al. U.S. Pat. No.

5,895,962, as well as "METHOD AND APPARATUS FOR STORAGE OF TEST RESULTS WITHIN AN INTEGRATED CIRCUIT," by Debenham et al., U.S. patent application Ser. No. 08/591,238, now abandoned, the details of which are incorporated by reference.

There are many uses for storing data relating to the individual IC part 200 in its nonvolatile memory elements 210. As is discussed by Debenham et al., after an IC part 200 is tested, one of the nonvolatile memory elements 210 can be used to indicate completion of the test. In this manner, the nonvolatile memory elements 210 can be read to verify that IC part 200 has indeed completed a previous test before proceeding to a subsequent test.

Instead of storing test results directly on IC part 200, the present invention uses the nonvolatile memory elements 210 to store a part identifier on each IC part 200. The part identifier is retrieved from IC part 200 during the various processing steps of fabricating, probing, and testing the IC part 200. Results from the processing steps can be stored in a computer database. By using a part identifier specific to individual IC parts, the present invention can reconstruct data summaries of like IC parts in any step that manufacturing that has access to these identifiers.

Figure 3:
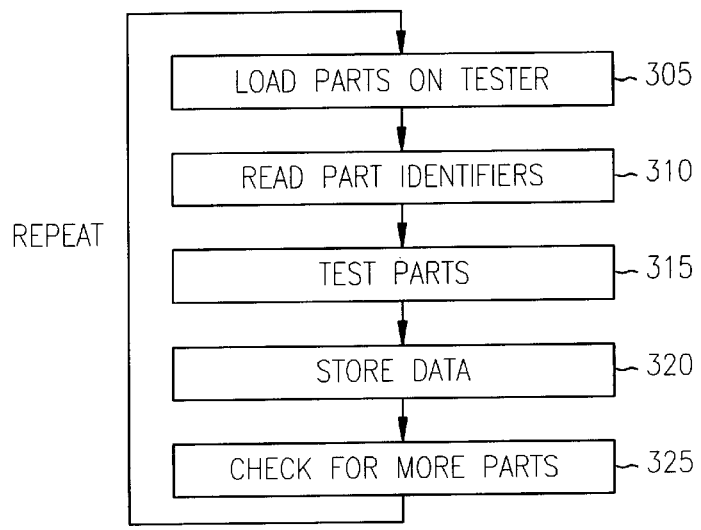
FIG. 3 is a flowchart of the method of the IC parts data summary.

The flowchart of the method of the present invention is shown in FIG. 3. For illustrative purposes, FIG. 3 describes the invention as implemented on a IC parts tester, which corresponds to IC Parts Processor 115 shown in FIG. 1. The invention can also be implemented on any other IC parts processor used throughout the fabrication, probing, and testing steps.

In the method shown by the flowchart, a plurality of IC parts 200 are loaded on the tester at step 305 of FIG. 3. The tester reads the part identifiers at step 310 from each of the loaded IC parts 200. Testing proceeds at step 315 and data from the testing is collected and stored in a computer database in the memory 110 of computer system 100. If there are more IC parts 200 that need testing, then the procedure repeats at step 325. Again, this method of tracking data for individual IC parts 200, as shown in FIG. 3, can be implemented on all of the machines used throughout the manufacturing process.

Once a database is generated by the fabrication, testing, and probing of IC parts 200 by the various IC parts processors 115, computer system 100 can be used to analyze and report data specific to individual IC parts 200. The database stored in computer system 100 can be sorted to reconstruct data summaries of parts that all began manufacturing together, or that have other similar characteristics.

Figure 4:
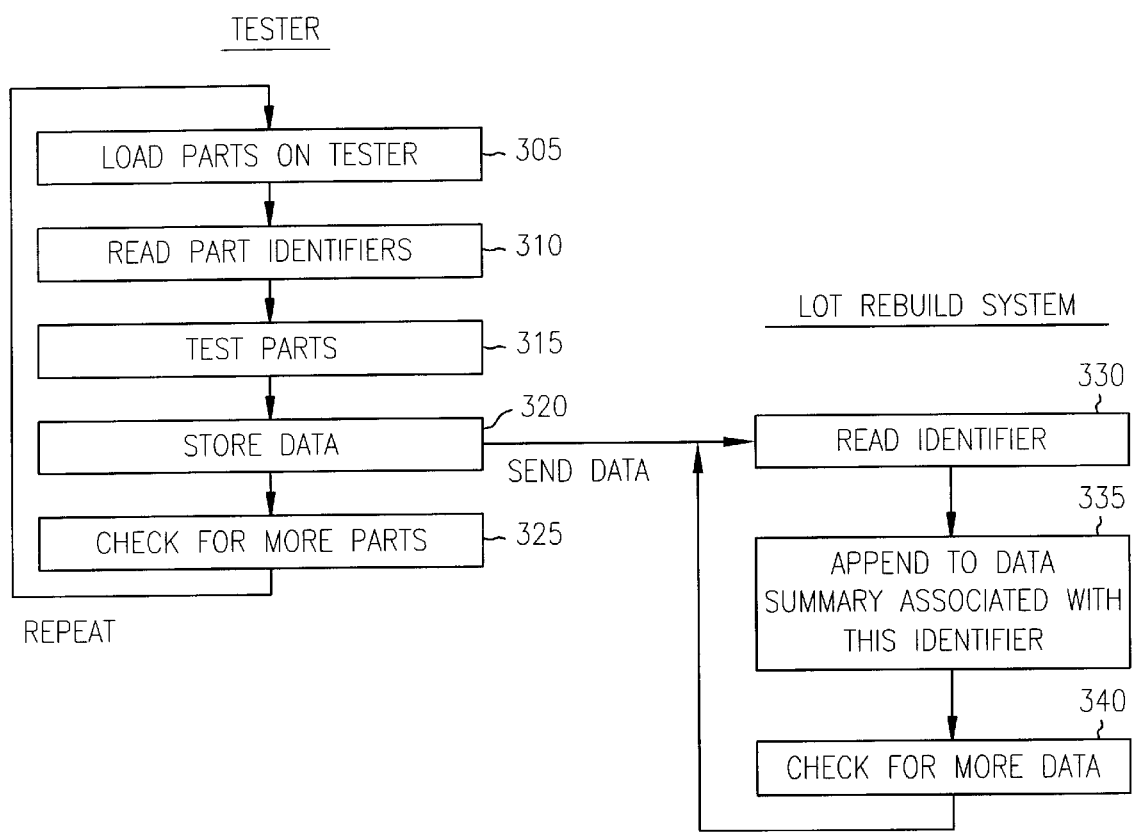
FIG. 4 is a flowchart of an alternate method of gathering and tracking statistics for IC parts.
Figure 5:
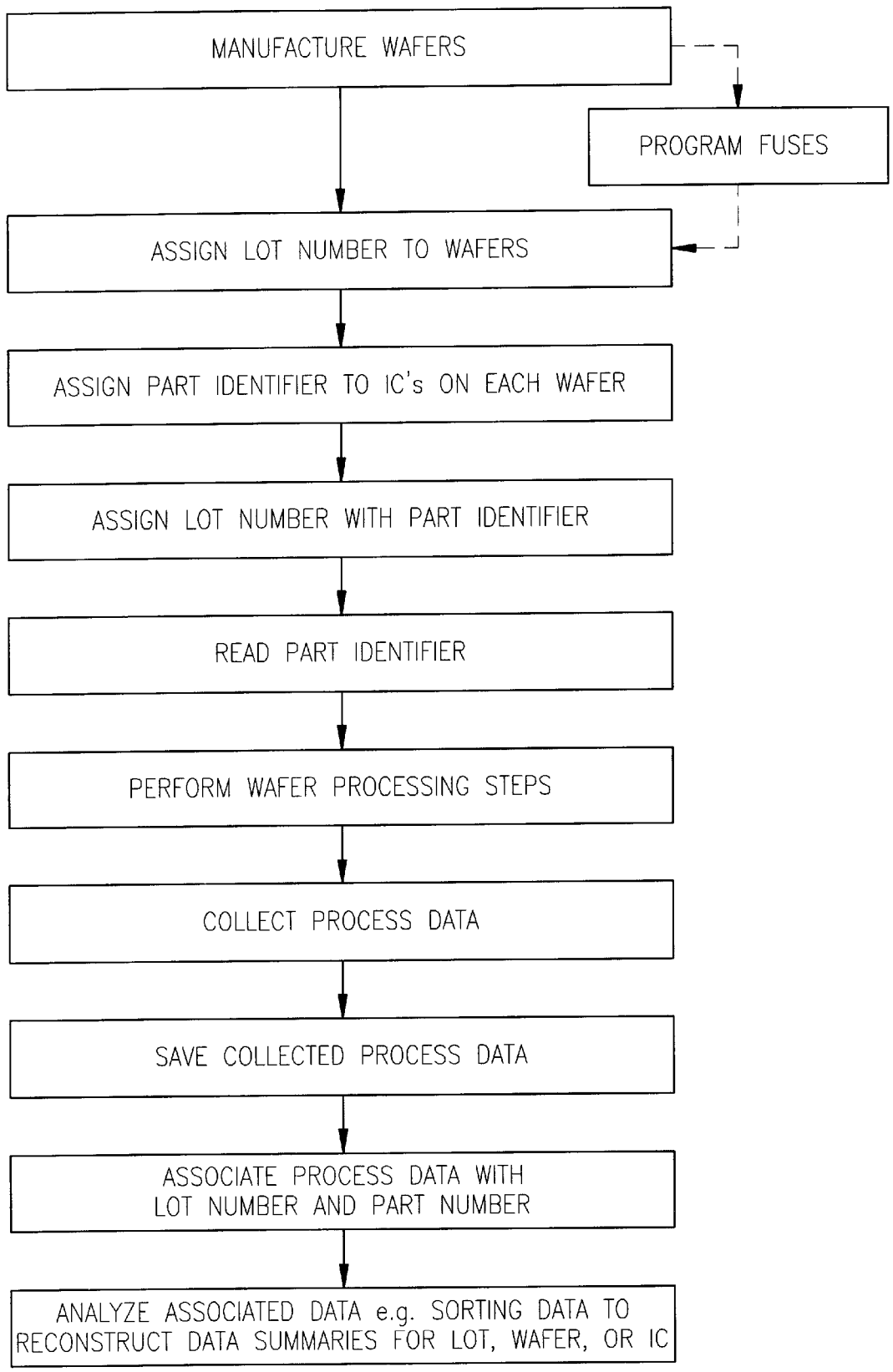
FIG. 5 is a flowchart of a method for gathering, tracking and using statistics for IC parts.

In another embodiment, the data may be fed to the computer processor 100 from parts processor 115 in real time, as shown in FIG. 4. The process shown in FIG. 4 is identical to the process shown in FIG. 3 except for the sending of data to the computer 100 at step 320 is performed for each IC processed.

Also shown in FIG. 4 are the steps for associating the data with the part identifiers. This association, performed by computer 100, may be used to gather and track statistics based on lot, wafer or individual parts. The statistics may show, by way of example and not by way of limitation, trends in failures of parts of a particular lot, types of failures in processing of wafers based on process variations, etc. Those skilled in the art will readily recognize that a wide variety of information may be tracked and associated with each integrated circuit or memory device without being limited to the size of the non-volatile memory on the individual circuits.

CONCLUSION

Although specific embodiments have been illustrated and described herein, it will be appreciated by those of ordinary skill in the art that any arrangement which is calculated to achieve the same purpose may be substituted for the specific embodiments shown. This patent is intended to cover any adaptations or variations of the present invention. Therefore, it is manifestly intended that this invention be limited only by the claims and the equivalents thereof.

We claim:

1. A method for tracking fabrication information for the manufacture of integrated circuit devices, comprising:

manufacturing a plurality of workpieces, each containing a plurality of integrated circuit devices, by performing a plurality of processing steps and storing process data associated with each processing step;

assigning a lot number for the plurality of workpieces;

assigning a part identifier to each integrated circuit device of the plurality of integrated circuit devices;

programming the part indentifier into a non-volatile portion of each integrated circuit device of the plurality of integrated circuit devices;

associating the lot number with the part identifier for each integrated circuit device of the plurality of integrated circuit devices;

reading the part identifier for each integrated circuit device of the plurality of integrated circuit devices;

testing each integrated circuit device of the plurality of integrated circuit devices to produce test results;

recording the test results for each integrated circuit device of the plurality of integrated circuit devices;

saving the process data and the test results to a memory in a computer;

associating the process data and the test results with the part identifier and the lot number for each integrated circuit device of the plurality of integrated circuit devices in a database to associate error information with at least one of the process data and the test results; and sorting the associated process data, the test results and the part identifier to construct data summaries of manufacturing processes.

2. The method according to claim 1, further including sorting the database to construct data summaries of ones of the plurality of integrated circuit devices that all began manufacturing together or that have at least one characteristic in common.

3. The method according to claim 2, further including sorting the database to construct trends in failures of integrated circuit devices of a particular lot.

4. The method according to claim 2, further including sorting the database to construct types of failures in processing of workpieces based on process variations.

5. The method of claim 1, wherein manufacturing a plurality of workpieces includes providing a wafer.

6. The method of claim 1, wherein manufacturing a plurality of workpieces includes providing a substrate.

7. The method of claim 1, wherein manufacturing a plurality of workpieces includes fabricating a plurality of memory devices.

8. A method for tracking fabrication information for the manufacture of integrated circuit parts, comprising:

manufacturing a plurality of integrated circuit parts on a workpiece by performing a plurality of processing steps and storing process data associated with each processing step;

assigning a lot number for a plurality of workpieces;

assigning a part identifier to each integrated circuit device of the plurality of integrated circuit parts;

programming the part identifier into a non-volatile portion of each integrated circuit device of the plurality of integrated circuit parts;

associating the lot number with the part identifier for each integrated circuit device of the plurality of integrated circuit parts;

reading the part identifier for each integrated circuit device of the plurality of integrated circuit parts;

testing each integrated circuit device of the plurality of integrated circuit parts to produce test results;

recording the test results for each integrated circuit device of the plurality of integrated circuit parts;

saving the process data and the test results to a memory;

associating the process data and the test results with the part identifier and the lot number for each integrated circuit device of the plurality of integrated circuit parts in a database to associate error information with at least one of the process data and the test results; and sorting the associated process data, the test results and the part identifier to construct data summaries of manufacturing processes.

9. The method according to claim 8, further including sorting the database to construct data summaries of ones of the plurality of integrated circuit parts that all began manufacturing together or that have at least one characteristic in common.

10. The method according to claim 9, further including sorting the database to construct trends in failures of parts of a particular lot.

11. The method according to claim 9, further including sorting the database to construct types of failures in processing of workpieces based on process variations.

12. The method of claim 8, wherein manufacturing a plurality of integrated circuit parts on a workpiece includes manufacturing a plurality of memory devices on the workpiece.

13. The method of claim 12, wherein manufacturing a plurality of memory devices on the workpiece includes manufacturing a dynamic random access memory.

14. The method of claim 12, wherein manufacturing a plurality of memory devices on the workpiece includes manufacturing a static random access memory.

15. The method of claim 8, wherein manufacturing a plurality of integrated circuit parts on a workpiece includes manufacturing the plurality of integrated circuit parts on a wafer.

16. The method of claim 8, wherein manufacturing a plurality of integrated circuit parts on a workpiece includes manufacturing the plurality of integrated circuit parts on a substrate.

17. A method for tracking fabrication information for the manufacture of integrated circuit parts, comprising:

manufacturing a plurality of integrated circuit parts on a workpiece by performing a plurality of processing steps and storing process data associated with each processing step;

assigning a part identifier to each integrated circuit device of the plurality of integrated circuit parts;

assigning a lot number to the workpiece;

programming the part identifier into a non-volatile portion of each integrated circuit device of the plurality of integrated circuit parts;

associating the lot number with the part identifier for each integrated circuit device of the plurality of integrated circuit parts;

reading the part identifier for each integrated circuit device of the plurality of integrated circuit parts;

testing at least one of the plurality of integrated circuit parts to produce test results;

recording the test results for the at least one integrated circuit part;

saving the process data and the test results to a memory;

associating the process data and the test results with the part identifier and the lot number for each integrated circuit device of the plurality of integrated circuit parts in a database to associate error information with at least one of the process data and the test results; and sorting the associated process data, the test results and the part identifier to construct data summaries of manufacturing processes.

18. The method according to claim 12, further including sorting the database to construct data summaries of ones of the plurality of integrated circuit parts that all began manufacturing together or that have at least one characteristic in common.

19. The method according to claim 18, further including sorting the database to construct trends in failures of parts of a particular lot.

20. The method according to claim 18, further including sorting the database to construct types of failures in processing step based on process variations.

21. The method of claim 17, wherein manufacturing a plurality of integrated circuit parts includes manufacturing a plurality of memory devices.

22. The method of claim 21, wherein manufacturing a plurality of memory devices includes manufacturing a dynamic random access memory.

23. The method of claim 21, wherein manufacturing a plurality of memory devices includes manufacturing a static random access memory.

24. The method of claim 17, wherein manufacturing a plurality of integrated circuit parts on a workpiece includes manufacturing the plurality of IC parts on a wafer.

25. The method of claim 17, wherein manufacturing a plurality of integrated circuit parts on a workpiece includes manufacturing the plurality of IC parts on a substrate.

26. A method for tracking fabrication information for the manufacture of integrated circuit devices, comprising:

providing a plurality of workpieces;

dividing the plurality of workpieces into lots;

assigning a lot number to each lot;

performing a plurality of processing steps on each lot of workpieces to form a plurality of integrated circuit devices on each workpiece;

storing process data associated with at least one of the plurality of processing steps;

assigning a part identifier to each integrated circuit device of the plurality of integrated circuit devices;

programming the part identifier into a non-volatile portion of each integrated circuit device of the plurality of integrated circuit devices;

associating the lot number with the part identifier for each integrated circuit device of the plurality of integrated circuit devices;

reading the part identifier for each integrated circuit device of the plurality of integrated circuit devices;

testing each integrated circuit device of the plurality of integrated circuit devices to produce test results;

recording the test results for each integrated circuit device of the plurality of integrated circuit devices;

saving the process data and the test results to a memory in a computer;

associating the process data and the test results with the part identifier and the lot number for each integrated circuit device of the plurality of integrated circuit devices in a database to associate error information with at least one of the process data and the test results; and sorting the associated process data, the test results and the part identifier to construct data summaries of manufacturing processes.

27. The method according to claim 26, further including sorting the database to construct data summaries of ones of the plurality of integrated circuit devices that all began manufacturing together.

28. The method according to claim 27, further including sorting the database to construct trends in failures of integrated circuit devices of a particular lot.

29. The method according to claim 28, further including sorting the database to construct types of failures in processing of workpieces based on process variations.

30. The method according to claim 26, further including sorting the database to construct data summaries of ones of the plurality of integrated circuit devices that have at least one characteristic in common.

31. The method according to claim 30, further including sorting the database to construct trends in failures of integrated circuit devices of a particular lot.

32. The method according to claim 31, further including sorting the database to construct types of failures in processing of workpieces based on process variations.

33. The method of claim 26, wherein performing a plurality of processing steps includes forming dynamic random access memories.

34. The method of claim 26, wherein performing a plurality of processing steps includes forming static random access memories.

35. The method of claim 26, wherein providing a plurality of workpieces includes providing a plurality of wafers.

36. The method of claim 26, wherein providing a plurality of workpieces includes providing a plurality of substrates.

* * * * *

UNITED STATES PATENT AND TRADEMARK OFFICE
CERTIFICATE OF CORRECTION

PATENT NO.     : 6,622,102 B2
DATED          : September 16, 2003
INVENTOR(S)    : Skidmore It is certified that error appears in the above-identified patent and that said Letters Patent is hereby corrected as shown below:

<u>Column 6,</u>
Line 20, delete "12" and insert -- 17 --, therefor.

Signed and Sealed this

Seventeenth Day of February, 2004

JON W. DUDAS
*Acting Director of the United States Patent and Trademark Office*